United States Patent [19]
Walters et al.

[11] Patent Number: 5,288,802
[45] Date of Patent: Feb. 22, 1994

[54] AUTOMOTIVE REFINISH PRIMER SURFACER CONTAINING ACETOACETATE FUNCTIONAL POLYESTERPOLYOL, A POLYACRYLATE, AND AN AMINE FUNCTIONAL EPOXY RESIN

[75] Inventors: David N. Walters, Slippery Rock; Cathy A. Kreutzer, Glenshaw; Padmanabhan Sundararaman, Allison Park, all of Pa.

[73] Assignee: PPG Industries, Inc., Pittsburgh, Pa.

[21] Appl. No.: 8,435

[22] Filed: Jan. 25, 1993

[51] Int. Cl.$^5$ .................. C08L 33/14; C08G 12/00; C08G 59/44

[52] U.S. Cl. .................. 525/110; 525/113; 525/438; 525/502; 525/528; 525/530; 525/531; 525/532; 528/107; 528/111; 528/113; 528/120; 528/121; 528/123; 528/124; 528/228; 528/229

[58] Field of Search ............... 525/110, 113, 438, 502, 525/528, 530, 531, 532; 528/107, 111, 113, 120, 121, 123, 124, 228, 229

[56] References Cited

U.S. PATENT DOCUMENTS

| | | | |
|---|---|---|---|
| 4,408,018 | 10/1983 | Bartman et al. | 525/304 |
| 4,772,680 | 9/1988 | Noomen et al. | 525/113 |
| 4,906,684 | 3/1990 | Say | 524/548 |
| 4,987,177 | 1/1991 | Den Hartog et al. | 524/517 |
| 5,021,537 | 6/1991 | Stark et al. | 528/106 |
| 5,100,969 | 3/1992 | Yamamoto et al. | 525/327.2 |
| 5,214,086 | 5/1993 | Mormile et al. | 524/237 |

FOREIGN PATENT DOCUMENTS

| | | |
|---|---|---|
| 227454 | 7/1987 | European Pat. Off. |
| 420133 | 4/1991 | European Pat. Off. |
| 481345 | 4/1992 | European Pat. Off. |
| 483915 | 5/1992 | European Pat. Off. |
| 3-79615 | 4/1991 | Japan. |
| 91/09910 | 7/1991 | World Int. Prop. O. |

OTHER PUBLICATIONS

Robert J. Clemens and F. Del Rector, "A Comparison of Catalysts for Crosslinking Acetoacetylated Resins via the Michael Reaction", Journal of Coatings Technology, vol. 61, No. 770, Mar. 1989, pp. 83-91.

F. Del Rector, W. W. Blount and D. R. Leonard, "Applications for Acetoacetyl Chemistry in Thermoset Coatings", Journal of Coatings Technology, vol. 61, No. 771, Apr. 1989, pp. 31-37.

J. Stewart Witzeman, W. Dell Nottingham and F. Del Rector, "Comparison of Methods for the Preparation of Acetoacetylated Coating Resins", Journal of Coatings Technology, vol. 62, No. 789, Oct. 1990, pp. 101-112.

P. M. Vandevoorde, "Chemical Structure and Coating Properties of Cured Acetoacetate Binders", FATIPEC-Kongr., vol. III (19th) 1988, pp. 137-154.

A. Noomen, "Ambient Temperature Curable Coatings Based on New Two-Pack Binders", Advances in Organic Coating and Science Technology Series, 1989, 11, pp. 251-271.

F. Del Rector, W. W. Blount, D. R. Leonard, "Applications for the Acetoacetyl Functionality in Thermoset Coatings", Presented at the Water-Borne and High Solids Coating Symposium, New Orleans, La., Feb. 1988.

*Primary Examiner*—Frederick Krass
*Attorney, Agent, or Firm*—Linda Pingitore

[57] ABSTRACT

Curable coating compositions are provided containing an amine group containing polyepoxide resin, an acetoacetate containing polyester having a weight average molecular weight of at least 1000, and a polyacrylate containing material. The amine group containing polyepoxide can be modified with a ketone and/or an aldehyde to form a ketimine and/or an aldimine containing polyepoxide. The compositions are useful as coatings, particularly as ambient or low temperature curable automotive refinish primer coatings having good corrosion resistance, adhesion to both substrate and other organic coatings, sandability and pot-life.

22 Claims, No Drawings

AUTOMOTIVE REFINISH PRIMER SURFACER CONTAINING ACETOACETATE FUNCTIONAL POLYESTERPOLYOL, A POLYACRYLATE, AND AN AMINE FUNCTIONAL EPOXY RESIN

BACKGROUND OF THE INVENTION

The present invention relates to curable compositions and more particularly to low or ambient temperature curable coating compositions which are useful in automotive refinish applications.

In the area of automotive refinish, repairing a defect in the original coating can involve sanding or grinding out the defect by mechanical means, or completely stripping the whole part or vehicle of its original coating layers. This sanding or grinding process typically results in the exposure of bare metal. Prior to the application of final top-coat materials, the use of three separate undercoating systems is generally recommended. The sanded area of exposed bare metal is first covered with a corrosion inhibitive primer, that is, a primer formulated with corrosion inhibitive pigments and which also has adhesion to both bare metal and organic coatings. The next step involves the application of what is referred to, in the art, as a sandable primer-surfacer. The final step requires the application of a primer, referred to as a sealer, which provides for improved adhesion of top-coats to the undercoated area. Such a refinish undercoat application process can be time consuming and expensive due to labor, volatile organic abatement engineering requirements and time required for drying of each of the applied undercoatings. It would thus be desirable to have one undercoat composition which would provide all of the requirements currently provided by several undercoatings.

SUMMARY OF THE INVENTION

In accordance with the present invention, there is provided a curable coating composition comprising: (a) an amine group containing polyepoxide resin which is essentially free of oxirane functionality and having an average of at least two amine groups per molecule and having a weight average molecular weight of from about 1000 to about 50,000; (b) an acetoacetate group functional polyester which is the transesterification reaction product of a polyester polyol and an acetoacetate group containing material, the polyester polyol prepared by esterification of an organic polycarboxylic acid or anhydride thereof with organic polyol and/or epoxide, and, having a weight average molecular weight of from about 1000 to about 50,000; (c) a polyacrylate material having at least two acrylate groups per molecule and having a weight average molecular weight from about one hundred to about 50,000.

DETAILED DESCRIPTION OF THE INVENTION

The principle ingredients in the curable coating compositions of the present invention are an amine group containing polyepoxide resin having an average of at least two amine groups per molecule, an acetoacetate containing polyester and a polyacrylate containing material having at least two acrylate groups per molecule. In a preferred embodiment of the present invention, the amine groups of the amine group containing polyepoxide are modified to form a ketimine containing polyepoxide resin. This preferred composition will be discussed in detail below.

The polyepoxide resin which is utilized in the preparation of the ketimine containing polyepoxide resin can be selected from a variety of materials.

A polyepoxide resin is generally one which contains at least two oxirane groups in the molecule, i.e.,

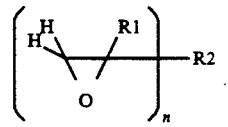

where n is at least two, R1 is hydrogen or methyl, and R2 broadly represents an organic based molecule or polymer typically composed of carbon, hydrogen, oxygen, and optionally nitrogen and or sulfur. Hydroxyl substituent groups can also be present and frequently are, as well as halogen and ether groups. Generally, the epoxide equivalent weight ranges from about 100 to about 1000, preferably from about 100 to about 500, and more preferably from about 150 to about 250. These resins can be broadly categorized as being aliphatic, aromatic, cyclic, acyclic, alicyclic or heterocyclic.

One particularly preferred group of polyepoxide resins, for use in the present invention, are the epoxy novalac resins. These resins are prepared by reacting an epihalohydrin with the condensation product of an aldehyde with a monohydric or polyhydric phenol. One example is the reaction product of epichlorohydrin with a phenolformaldehyde condensate.

Another group of useful polyepoxide resins are the polyglycidyl ethers of polyhydric aromatic alcohols, such as for example, dihydric phenols. The phenol must be at least dihydric and suitable examples include resorcinol, catechol, hydroquinone, bis(4-hydroxyphenyl)-1,1-isobutane; 4,4-dihydroxybenzophenone; bis(4-hydroxyphenyl)1,1-isobutane; 4,4-dihydroxybenzophenone; bis(4-hydroxyphenyl)-1,1-ethane; bis(2-hydroxynaphenyl)methane; 1,5-hydroxynaphthalene and 4,4'-isopropylidenediphenol, i.e., bisphenol A. Preferably bisphenol A is utilized. Of the many epoxy compounds possible, the one principally utilized is epichlorohydrin although epibromohydrin is also quite useful. The polyglycidyl ethers especially useful herein are obtained by reacting epichlorohydrin and bisphenol A in the presence of an alkali such as sodium or potassium hydroxide. The series of epoxy resins sold by Shell Chemical Company under the trademark EPON are especially useful herein.

Another group of useful polyepoxide resins are the polyglycidyl ethers derived from such polyhydric alcohols as ethylene glycol; diethylene glycol; triethylene glycol; 1,2-propylene glycol; 1,4-butylene glycol; 1,5-pentanediol; 1,2,6-hexanetriol; glycerol and trimethylolpropane.

Also useful are the polyepoxide resins which are polyglycidyl ethers of polycarboxylic acids. These materials are produced by the reaction of an epoxy compound such as epichlorohydrin with an aliphatic or aromatic polycarboxylic acid such as oxalic acid; succinic acid; glutaric acid; terephthalic acid; 2,6-naphthalene dicarboxylic acid and dimerized linoleic acid.

Still another group of polyepoxide resins are derived from epoxidation of olefinically unsaturated alicyclic materials. Among these are the epoxy alicyclic ethers and esters well known in the art.

Besides the materials discussed above, useful epoxy resins also include those containing oxyalkylene groups, i.e.,

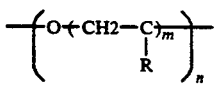

wherein R is hydrogen or C1 to C6 alkyl, m is an integer from 1 to 4 and n is an integer from 2 to 50. Such groups can be pendant from the backbone of the epoxide resin or they can be included as part of the backbone. The proportion of oxyalkylene groups in the polyepoxide resin depends upon a number of factors, among them the size of the oxyalkylene group and the nature of the epoxy resin.

It should be understood that mixtures of polyepoxide resins are also useful herein.

The ketimine containing polyepoxide can be prepared from anyone of the above polyepoxides in the following manner. First a polyhydric amine compound having an average of at least two amine groups per molecule, i.e., a polyamine, is modified by reaction with a ketone to form the ketimine. For example, one mole of diethylenetriamine reacted with two moles of methylisobutyl ketone, produces a diketimine with secondary amine functionality plus two moles of water. Alternatively, an aldehyde can be used in place of or in conjunction with the ketone to form a modified amine referred to as an aldimine. This ketimine, or aldimine, modified amine is then reacted with a polyepoxide, depleting effectively all of the oxirane groups of the polyepoxide and resulting in a ketimine, or aldimine, containing polyepoxide which is essentially free of oxirane groups. By "essentially free of oxirane groups" is meant that the epoxy equivalent weight of the ketimine containing polyepoxide is measured to be about at least 5000 (g/equivalent of epoxy). That is, the ketimine containing polyepoxide contains, on average, less than 1, more preferably, on average, less than 0.5 oxirane groups per molecule.

Representative polyamines which can be used in the practice of the present invention can be described as aliphatic or cycloaliphatic amines having from 2 to 10 primary and/or secondary amino groups, preferably from 2 to 4 primary amino groups and from 2 to 200 carbon atoms. Examples of suitable polyamines include ethylenediamine, propylenediamine, butylenediamine, pentamethylenediamine, hexamethylenediamine, decamethylenediamine, 4,7-dioxadecane-1,10-diamine, dodecamethylenediamine, 4,9-dioxadodecane-1,12-diamine, 7-methyl-4,10-dioxatridecane-1,13-diamine, 1,2-diaminocyclohexane, 1,4-diaminocyclohexane, 4,4'-diaminodicyclohexyl methane, isophorone diamine, bis(3-methyl-4-aminocyclohexyl)methane, 2,2-bis(4-aminocyclohexyl)propane, nitrile tris(ethane amine), bis(3-aminopropyl) methylamine, 2-amino-1-(methylamino)propane, 3-amino-1-(cyclohexylamino)propane and N-(2-hydroxyethyl)ethylene diamine.

A particularly preferred group of polyamines that are useful in the practice of the present invention can be represented by the following structural formula;

$H_2N-(R'-NH)_n-R-NH_2$ where the group R and R' can be the same or different and represent an alkylene group containing from 2 to 6 and preferably from 2 to 4 carbon atoms and n is a number from 1 to 6 and preferably from 1 to 3. By an alkylene group is meant a cycloalkylene group or an alkylene group containing an ether-oxygen atom. Examples of representative polyalkylene polyamines include diethylenetriamine, dipropylenetriamine and dibutylenetriamine. These polyamines have two primary amino groups and one secondary amino group.

The ketone used in modifying the polyamine can be represented by the following structural formula:

wherein R and R' are independently alkanes having between 1 and 12 carbon atoms.

Examples of suitable ketones used as modifiers or blocking agents for the amine groups include, acetone, diethyl ketone, methylisobutyl ketone, isobutyraldehyde, hydroxybutyraldehyde, pentanone, cyclohexanone, ethylamyl ketone, hydroxycitronellal, isophorone and decanone.

The ketimine containing polyepoxide resin typically has a weight average molecular weight from about 1000 to about 50,000, as determined by gel permeation chromatography, (GPC), using a polystyrene standard, preferably from about 1000 to about 10,000 and more preferably from about 1000 to about 5000. Further the ketimine containing polyepoxide resin can be described as having an average of at least two ketimine groups per molecule, typically an average of about 2 to about 25 ketimine groups per molecule, and preferably from about 3 to about 6.

The acetoacetate containing polyester is prepared as the transesterification reaction product of a polyester polyol and an acetoacetate containing material. The polyester polyol can be prepared by esterification of an organic polycarboxylic acid or anhydride thereof with organic polyol and/or an epoxide. Usually, the polycarboxylic acid or anhydride is an aliphatic or aromatic dibasic acid or acid anhydride and the polyol is a diol.

Examples of diols which are usually employed in preparing the polyester polyol include alkylene glycols such as ethylene glycol, neopentyl glycol and other glycols such as cyclohexane diol, bisphenol-A, hydrogenated bisphenol-A, cyclohexanedimethanol, the reaction products of lactones and diols, for example, the reaction product of epsilon-caprolactone and ethylene glycol, hydroxy-alkylated bisphenols, polyether glycols, for example, poly(oxytetramethylene)glycol and the like.

The acid component of the polyester polyol consists primarily of monomeric carboxylic acids or anhydrides having 2 to 18 carbon atoms per molecule. Among the acids which are useful are phthalic acid, isophthalic acid, terephthalic acid, tetrahydrophthalic acid, hexahydrophthalic acid, methylhexahydrophthalic acid, adipic acid, azelaic acid, sebacic acid, maleic acid, glutaric acid, chlorendic acid and tetrachloophthalic acid. Also, there may be employed higher polycarboxylic acids such as trimellitic acid and tricarballylic acid.

Besides the polyester polyols formed from polybasic acids and polyols, polylactone-type polyesters can also be employed. These products are formed from the reaction of a lactone such as epsilon-caprolactone and a polyol such as ethylene glycol, diethylene glycol or trimethylolpropane.

Besides polyester polyols, polyurethane polyols such as polyester-urethane polyols which are formed from reacting an organic polyisocyanate with a polyester polyol such as those described above can be used. The organic polyisocyanate is reacted with a polyol so that the OH/NCO equivalent ratio is greater than 1:1 such that there are resultant free hydroxyl groups and an isocyanate equivalent weight approaching infinity. The organic polyisocyanate which is used in preparing the polyurethane polyols can be of varying types but usually is an aliphatic or aromatic polyisocyanate or a mixture. Diisocyanates are preferred, although higher polyisocyanates such triisocyanates can be used.

Examples of suitable diisocyanates are 4,4'-diphenylmethane diisocyanate, 1,4-tetramethylene diisocyanate, isophorone diisocyanate and 4,4'-methylenebis(cyclohexyl isocyanate). Examples of suitable higher functionality polyisocyanates are polymethylene polyphenyl isocyanates.

The acetoacetate containing material can be represented by the following structural formula:

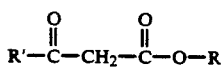

where R and R' can be chosen independently from alkyl groups containing typically between one and ten carbon atoms. Typically, R' is a methyl group. A particularly preferred alkyl group is tertiary-butane and the associated acetoacetate material containing this alkyl group would be referred to as tertiary-butyl acetoacetate. It should be understood that the acetoacetate containing material can be an acetoacetate group containing polymer, if desired.

The transesterification, (or more specifically transacetylation), reaction is conducted by conventional transesterification polymerization techniques, well known in the art of polymer chemistry. The reaction between the polyester polyol and the acetoacetate containing material typically involves mixing the polyester polyol and the acetoacetate, for example tertiary-butyl acetoacetate, in a suitable vessel, at elevated temperature, for example in the range of from about 150° C. to about 300° C., and vacuum, with the removal of tertiary-butanol. If desired, a detailed treatment of this subject can be found in a paper by Witzman et al entitled, "Comparison of Methods for the Preparation of Acetoacetylated Coating Resins", Journal of Coatings Technology, Vol. 62, No. 789, October 1990.

The acetoacetate containing polyester has a weight average molecular weight of at least about 1000, as determined by gel permeation chromatography using a polystyrene standard. Typically the weight average molecular weight ranges from about 1000 to about 50,000, preferably from about 1000 to about 10,000 and more preferably from about 1000 to about 5000. The acetoacetate containing polyester has an acetoacetate equivalent weight from about 100 to about 1000 (grams-/equivalents), preferably from about 100 to about 500 and more preferably from about 200 to about 300.

The polyacrylate containing material of the claimed curable composition, contains at least two acrylate groups per molecule. The polyacrylate which is used can be formed as the transesterification reaction product of a polyol and an acrylate or methacrylate containing material. Additionally, the polyacrylate can also be formed as the reaction product of a polyisocyanate and a hydroxyl group containing acrylate or methacrylate.

The polyol is typically a low molecular weight diol, triol or tetrol. These polyols generally have a formula molecular weight ranging from about 50 to about 1000, and preferably from about 100 to about 500. Examples of suitable materials include, trimethylolpropane, pentaerythritol, trimethylolethane, neopentyl glycol, 1,6-hexanediol, dipentaerythritol, ethoxylated Bisphenol A and tris(2-hydroxy ethyl)isocyanurate. Preferably a diol such as ethoxylated Bisphenol A is used. It should be understood, however, that if desired, higher molecular weight polyols such as oligomeric or polymeric polyols can be utilized to prepare the polyacrylate containing material.

The polyisocyanate is typically a low molecular weight diisocyanate or triisocyanate. These polyisocyanates generally have a formula molecular weight ranging from about 200 to about 1000, and preferably from about 200 to about 600. Examples of suitable polyisocyanate materials include, toluenediisocyanate, 4,4'-diphenylmethanediisocyanate, isophoronediisocyanate, tris(toluenediisocyanate)trimethylolpropane, 1,6-hexamethylenediisocyanate, 1,4-tetramethylenediisocyanate and 4,4'-methylenebis(cyclohexyl isocyanate). It should be understood, however, that if desired, higher molecular weight polyisocyanates such as oligomeric or polymeric polyisocyanates can be utilized to prepare the polyacryate containing material.

The acrylate or methacrylate containing material can be represented by the following structural formula,

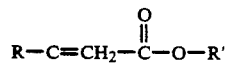

where R is H or CH3, and R' contains from one to 20 carbon atoms and optionally at least one hydroxyl group. Examples of suitable materials include methyl methacrylate, ethyl methacrylate, butyl methacrylate, hexylmethacrylate, 2-hydroxyethyl methacrylate, methyl acrylate, ethyl acrylate, butyl acrylate, hexyl acrylate, and 2-hydroxyethyl acrylate.

The polyacrylate containing materials used in the claimed curable composition generally have a weight average molecular weight from about 100 to about 50,000 as determined by GPC using a polystyrene standard. The polyacrylate containing materials used in the preferred embodiment of the invention are low molecular weight materials which have a formula weight generally from about 100 to about 5000, and preferably from about 100 to about 500.

Examples of suitable polyacrylate containing materials include 1,6-hexanediol diacrylate, trimethylolpropane triacrylate, pentaerythritol tetraacrylate, ethoxylated bisphenol A diacrylate, and tris(2-hydroxyethyl-)isocyanurate triacrylate.

The ketimine containing polyepoxide is generally present in the claimed curable coating compositions in amounts of about 25 to 75, preferably from about 30 to about 50 percent by weight, the percentages based on total weight of resin solids. The acetoacetate containing polyester is generally present in amounts of from about 25 to about 75, preferably about 25 to about 45 percent by weight, the percentages based on total weight of resin solids. The polyacrylate containing material is generally present in amounts of from about 1 to 50, preferably from about 5 to 25 percent by weight, the percentages based on total weight of resin solids.

Although not intending to be bound by any theory, it is believed that the acetoacetate containing polyester and the polyacrylate containing material both react with the ketimine containing polyepoxide resin, to cure the claimed compositions. The reaction is thought to proceed by the deblocking of ketones from the ketimine containing polyepoxide which exposes the primary amines attached to the polyepoxide backbone. It is these primary amines which are belived to react with the acetoacetate containing polyester and the polyacrylate material.

Optionally an acid catalyst can be used to accelerate the deblocking of the ketimine containing polyepoxide which results in the generation of primary amines attached to the polyepoxide backbone. Examples of appropriate acid catalysts include, stearic acid, isostearic acid, undecylenic acid, and phosphoric acid. It should be understood that any organic or inorganic acid could serve as a catalyst, but it is preferred that the acid be monofunctional. If used, the acid is generally present in minor amounts, typically from about 0.1 to 1.0 percent by weight, the percentage based on total weight of resin solids.

It is preferred that the claimed curable coating compositions be essentially free of strong base, examples of which include, 1,8-Diazabicyclo[5.4.0]undec-7-ene, 1,5-Diazabicylo[4.3.0]non-5-ene, tetramethylguanidine, sodium hydroxide and potassium hydroxide. By "strong base" is meant that the pKb of the base is greater than or equal to 11. By "essentially free of strong base", is meant that no more than 1 percent by weight, the percentage based on total resin solids, is present in the composition. The presence of strong base is believed to catalyze Michael addition between the acetoacetate containing polyester and the polyacrylate containing material, see Clemens et al, "A Comparison of Catalysts for Crosslinking Acetoacetylated Resins via the Michael Reaction", Journal of Coatings Technology, Vol. 61, No. 770, March 1989. Cure by this Michael reaction is not desirable since it has been observed to result in an unacceptably reduced pot-life of the coating composition.

The coating compositions of the present invention are generally prepared as two package compositions with the ketimine containing polyepoxide resin in one package and the acetoacetate containing polyester and polyacrylate containing material both in the second package. Preferably, the ketimine containing polyepoxide resin is incorporated in the pigment containing grind paste. It should be understood that the components can be placed in either package as desired so long as the ketimine containing polyepoxide is in a separate package from both the acetoacetate containing polyester and the polyacrylate containing material.

A number of optional conventional ingredients can be added to the coating composition of the present invention such as pigments, rheology control agents, flow control agents, corrosion inhibitive pigments, adhesion promoters, catalysts, cure retarders and fillers. A solvent or solvent blend is generally utilized to reduce the coating composition to an optimum spray viscosity. Examples of suitable reducing solvents include acetone, methyl ethyl ketone, methyl isobutyl ketone, methyl amyl ketone and butyl acetate. Preferably, a solvent blend is utilized, more particularly a blend of acetone, methyl amyl ketone and methyl isobutyl ketone.

The coating compositions of the present invention can be applied to a variety of substrates by any of the conventional coating techniques such as brushing, spraying, dipping or flowing, but it is preferred that spray application be used since this generally provides optimum appearance. Any of the known spray techniques can be employed such as compressed air spraying, electrostatic spraying including either manual or automatic methods. The coating composition is typically applied such that a dry film thickness in the range of about 50 to about 200 microns is obtained.

The claimed coating compositions can be dried preferably at ambient temperature in about two hours, (that is such that the coating is sandable and will not foul the sanding material), or at elevated temperatures ranging from about 40° C. to about 170° C. in a period ranging from about 40 to about 10 minutes, respectively. Essentially complete cure can generally be achieved in about three to about four hours. For the purposes of the present invention, essentially complete cure is intended to mean the attainment of satisfactory performance properties, even though the crosslinking reaction may not reach completion.

The coating compositions of the present invention are particularly advantageous as primer surfacer coating compositions for automotive refinish applications. The compositions can be applied directly to bare metal surfaces and, after being allowed to dry and the finish prepared such as by sanding, coated directly with a pigmented topcoat composition or "color plus clear" topcoat system. The claimed coating compositions can be used as a single primer or undercoat material beneath a topcoat potentially replacing three separate undercoats which have historically been required to obtain optimum results.

The claimed compositions exhibit excellent appearance, sandability, salt spray resistance, pot-life and adhesion to both bare metal and other organic coatings that may already be present on the substrate, as well as subsequently applied topcoats.

The present invention is more particularly described in the following examples, which are illustrative only. All quantities, percentages and ratios are on a weight basis unless otherwise indicated.

Testing Procedures

Pencil hardness was determined by taking pencils of increasing hardness (from 6B to 5H), and attempting to etch a scribe mark in the coating. The next softest pencil to the pencil which was found to etch the coating was reported as the pencil hardness for the film, in accordance with ASTM-D3363. Pencil hardness was determined at both 24 hours and 7 days after the curable coating compositions were applied.

Gloss was measured, using a PACIFIC SCIENTIFIC 60/Glossmeter, in accordance with ASTM-D523. Gloss readings were obtained at both 24 hours and 7 days after the curable coating compositions were applied.

Pot-life was determined by measuring the viscosity of the combined two-pack curable coating compositions at 15 minute intervals, using a BROOKFIELD LVT viscometer, with a number-2 spindle and at a setting of 60 revolutions per minute. The time at which the viscosity was observed to become greater than 250 centipoise, (cPs), was taken to be the pot-life of the curable coating composition.

Sandability was determined by sanding the applied curable coating compositions at one hour intervals at room temperature, using grade 400-A sand paper, available commercially from 3M. The time at which the applied curable coating composition was observed to be sandable, that is, when it did not foul the sand paper, was taken to be the minimum required time after application until sandable.

Distinctness of Image, (D.O.I.), was determined using a C-BOX DOI instrument available commercially from I2R. D.O.I. was measured at both 24 hours and 7 days after the curable coating compositions were applied.

Sward hardness was determined in accordance with ASTM-D2143, at both 24 hours and 7 days after the curable coating compositions were applied. The value given for Sward Hardness was indicative of the number of cycles, or rockings, of the Sward Hardness wheel prior to the formation of indentations in the coating. The larger the value given for Sward Hardness, the harder the coating being tested.

Top-coat adhesion to the claimed curable coating compositions was determined by first applying a commercially available one coat pigmented refinish top coat, (PPG Industries, Inc. Product code: DAU-9300), which was cured at ambient temperature over a period of 24 hours. The adhesion of this top-coat system to the claimed curable coating, (undercoating), compositions was determined in accordance with ASTM-D3359 at both 24 hours and 7 days after the curable coating compositions were applied. The scale for this test ranges from 0B to 5B, 0B indicating very poor adhesion and 5B indicating excellent adhesion.

EXAMPLES

The following examples, (Examples A to C), show the preparation of various resins that are used in the practice of the invention.

EXAMPLE A

This example describes the preparation of a preferred embodiment of the acetoacetate functional polyester. The acetoacetate functional polyester was prepared from the following mixture of ingredients:

| Ingredients | Parts by Weight (grams) |
| --- | --- |
| Charge-I | |
| Neopentyl Glycol | 82.0 |
| Ethylene Glycol | 97.4 |
| 1,4-Cyclohexane dimethanol | 113.0 |
| Dimethyl 1,4-cyclohexanedicarboxylate | 314.0 |
| Trimethylolpropane | 565.0 |
| Benzene Sulfonic Acid | 3.14 |
| Triphenyl Phosphite | 3.14 |
| Charge II | |
| Isophthalic Acid | 260.62 |
| Charge III | |
| Tertiary Butyl Acetoacetate | 1986.00 |
| Total | 1432.22 |

A suitable 4-neck reaction vessel, equipped with an appropriate agitator, nitrogen blanket, glycol recovery setup and simple vacuum distillation setup was initially charged, at room temperature, with Charge-I. The reaction mixture was then heated to 180° C. and held for 30 minutes while methanol was removed by distillation. The reaction mixture was further heated to 200° C. and held for another 30 minutes while more methanol was removed by distillation. The reaction mixture was heated further to 230° C., while additional methanol was removed by distillation. The reaction mixture was then cooled to 180° C. and Charge-II was added. The reaction mixture was then heated to 240° C. and water was removed by distillation. The reaction mixture was held at 240° C. until the acid value of the mixture was less than 5.0 (milligrams KOH/gram Sample). Upon reaching a measured acid value of less than 5.0 (milligrams KOH/gram Sample), the reaction mixture was cooled to 70° C. whereupon Charge-III was added. The reaction mixture was then heated to 130° C. and tertiary butanol was removed by distillation under atmospheric pressure. When the atmospheric distillation of tertiary butanol was complete, a simple vacuum distillation was conducted until no more tertiary butanol could be removed.

EXAMPLE B

This example describes the synthesis of a ketimine used in the preparation of a ketimine functional polyepoxide resin. The ketimine was synthesized from the following mixture of ingredients.

| Ingredients | Parts by Weight (grams) |
| --- | --- |
| Charge-I | |
| Diethylenetriamine | 880. |
| Methyl Isobutyl Ketone | 2600. |
| Total | 3480. |

A suitable reaction vessel, equipped with an appropriate agitator, nitrogen blanket, reflux set-up and distillation apparatus, was initially charged, at room temperature, with Charge-I. The reaction mixture was heated to a temperature of about 107° C., to begin reflux. As the reaction progressed, water was removed by distillation. As the reaction reached completion, as determined by the amount of water collected by distillation, the reaction temperature increased to from about 138° C. to 141° C., whereupon a strong reflux was maintained until no more water was removed by distillation. During this latter reflux stage, additional methyl isobutyl ketone was added as required to maintain a reflux temperature below about 141° C.

EXAMPLE C

This example describes the preparation of a preferred ketimine containing polyepoxide resin. The ketimine containing polyepoxide resin was prepared from the following mixture of ingredients:

| Ingredients | Parts by Weight (grams) |
| --- | --- |
| Charge-I | |
| Diketimine Precursor From Example-B | 2250. |
| ARALDITE EPN-1139[1] | 1450. |
| Charge-II | |
| Triethanolamine | 19.0 |
| Total | 3719.0 |

[1] ARALDITE EPN-1139 is an epoxy phenolic novalac resin available commercially from Ciba-Geigy.

A suitable reaction vessel, equipped with an appropriate agitator, nitrogen blanket, and a reflux condenser was initially charged, at room temperature, with Charge-I. With agitation, the reaction vessel was heated to 71° C. The contents of the reaction vessel were allowed to reflux until an epoxy equivalent weight of 4400 was reached and then Charge-III was added. The contents of the reaction vessel were again allowed to reflux until a final epoxy equivalent weight of 13,100 and a final amine equivalent weight of 230 were reached. The contents of the reaction vessel were then transferred into an appropriate container.

COATING COMPOSITION EXAMPLES

Examples 1 through 3 describe the formulation of components and additive mixtures used in the preparation of a pigmented curable primer coating composition according to the present invention.

EXAMPLE 1

This example describes a grind paste used in the formulation of a pigmented curable primer coating composition, in accordance with the present invention.

| Ingredients | Parts by Weight (grams) |
|---|---|
| Resin From Example-C | 315.25 |
| Methyl Isobutyl Ketone | 217.81 |
| LOVEL ® 27[2] | 9.69 |
| Talc[3] | 309.73 |
| RAVEN 1000 Carbon Black[4] | 0.39 |
| Barium Sulfate | 209.38 |
| Zinc Phosphate | 129.77 |
| ANTI-TERRA U[5] | 0.98 |
| ATAGEL 50[6] | 5.76 |
| MPA 2000T[7] | 5.86 |
| Total | 1321.62 |

[2]LOVEL ® 27 is a fumed silica, commercially available from PPG Industries.
[3]Talc is commercially available from Luzenak America, as VERTAL 350 TALC.
[4]RAVEN 1000 Carbon Black is commercially available from Columbian Chemical.
[5]ANTI-TERRA U is a pigment wetting agent, commercially available from BYK Chemie.
[6]ATAGEL 50 is a clay, commercially available from Engelhard.
[7]MPA 2000T is a wax antisettling agent, commercially available from Rheox.

The grind paste was prepared by first combining the resin from Example C and the methyl isobutyl ketone in a suitable vessel with agitation. All of the remaining pigments were then added with high speed agitation using a Cowles blade. Agitation was continued at high speed for 30 minutes until a Hegman grind of 5 to 5.5 was attained.

EXAMPLE 2

This example describes a catalyst solution used in the formulation of a pigmented curable primer coating composition, in accordance with the present invention.

| Ingredients | Parts by Weight (grams) |
|---|---|
| EMERSOL-875[8] | 172.13 |
| Methyl Ethyl Ketone | 516.39 |
| Total | 688.52 |

[8]EMERSOL-875 is isostearic acid, available from Henkel.

EXAMPLE 3

This example describes a solvent blend used in the formulation of a pigmented curable primer coating composition, in accordance with the present invention.

| Ingredients | Parts by Weight (grams) |
|---|---|
| Acetone | 312.60 |
| Methyl Amyl Ketone | 177.15 |
| Methyl Isobutyl Ketone | 177.15 |
| Total | 666.90 |

Example I describes a preferred pigmented curable primer coating composition according to the claimed invention. Examples III to VI illustrate curable coating compositions according to the present invention with varying amounts of the claimed components but formulated such that the total equivalents of ketimine was equal to the sum of the acetoacetate equivalents plus the acrylate equivalents. Example II is a comparative example formulated without the polyacrylate component. This example illustrates the criticality of the polyacrylate in the claimed composition, primarily in terms of pot-life stability. Physical test data obtained from these examples points to the optimum relative ratios of the three essential resinous components as they are found in the preferred embodiment of the present invention.

EXAMPLE I

A preferred pigmented, curable primer coating composition, suitable for direct application to metal.

| Ingredients | Parts by Weight (grams) |
|---|---|
| Package 1: | |
| Grind Paste of Example-1 | 257.10 |
| Package 2: | |
| SR349 DIACRYLATE[9] | 15.00 |
| Acetoacetate Functional Polyester | 36.93 |
| Resin From Example-A | |
| Solvent Blend From Example-3 | 61.23 |
| Catalyst Solution From Example-2 | 1.00 |
| Total | 371.26 |

[9]SR349 DIACRYLATE is Ethoxylated Bisphenol-A Diacrylate, commercially available from Sartomer.

The coating composition was prepared by combining packages 1 and 2 with agitation immediately prior to use.

COMPARATIVE EXAMPLE

EXAMPLE II

This example describes the formulation of a pigmented curable primer coating composition prepared without polyacrylate containing material.

| Ingredients | Parts by Weight (grams) |
|---|---|
| Package 1: | |
| Grind Paste of Example-1 | 262.20 |
| Package 2: | |
| Acetoacetate Functional Polyester | 50.98 |
| Resin From Example-A | |
| Solvent Blend From Example-3 | 60.29 |
| Catalyst Solution From Example-2 | 0.99 |
| Total | 374.46 |

The coating composition was prepared by combining packages 1 and 2 with agitation immediately prior to use.

EXAMPLE III

This example describes the formulation of a pigmented curable primer coating which was made with 5 percent by weight based on total weight of resin solids of polyacrylate functional material.

| Ingredients | Parts by Weight (grams) |
|---|---|
| Package 1: | |
| Grind Paste of Example-1 | 260.11 |
| Package 2: | |
| SR349 DIACRYLATE | 5.00 |
| Acetoacetate Functional Polyester Resin From Example-A | 46.37 |
| Solvent Blend From Example-3 | 60.62 |
| Catalyst Solution From Example-2 | 1.01 |
| Total | 1373.11 |

SR349 DIACRYLATE is Ethoxylated Bisphenol-A Diacrylate, commercially available from Sartomer.

The coating composition was prepared by combining packages 1 and 2 with agitation immediately prior to use.

EXAMPLE IV

This example describes the formulation of a pigmented curable primer coating which was made with 10 percent by weight based on total weight of resin solids of polyacrylate functional material.

| Ingredients | Parts by Weight (grams) |
|---|---|
| Package 1: | |
| Grind Paste of Example-1 | 258.81 |
| Package 2: | |
| SR349 DIACRYLATE | 9.99 |
| Acetoacetate Functional Polyester Resin From Example-A | 41.62 |
| Solvent Blend From Example-3 | 60.67 |
| Catalyst Solution From Example-2 | 1.00 |
| Total | 372.09 |

SR349 DIACRYLATE is Ethoxylated Bisphenol-A Diacrylate, commercially available from Sartomer.

The coating composition was prepared by combining packages 1 and 2 with agitation immediately prior to use.

EXAMPLE V

This example describes the formulation of a pigmented curable primer coating which was made with 20 percent by weight based on total weight of resin solids of polyacrylate functional material.

| Ingredients | Parts by Weight (grams) |
|---|---|
| Package 1: | |
| Grind Paste of Example-1 | 255.38 |
| Package 2: | |
| SR349 DIACRYLATE | 20.00 |
| Acetoacetate Functional Polyester Resin From Example-A | 32.25 |
| Solvent Blend From Example-3 | 61.55 |
| Catalyst Solution From Example-2 | 1.00 |
| Total | 370.18 |

SR349 DIACRYLATE is Ethoxylated Bisphenol-A Diacrylate, commercially available from Sartomer.

The coating composition was prepared by combining packages 1 and 2 with agitation immediately prior to use.

EXAMPLE VI

This example describes the formulation of a pigmented curable primer coating which was made with 25 percent by weight based on total weight of resin solids of polyacrylate functional material.

| Ingredients | Parts by Weight (grams) |
|---|---|
| Package 1: | |
| Grind Paste of Example-1 | 253.60 |
| Package 2: | |
| SR349 DIACRYLATE | 25.00 |
| Acetoacetate Functional Polyester Resin From Example-A | 27.58 |
| Solvent Blend From Example-3 | 61.90 |
| Catalyst Solution From Example-2 | 1.00 |
| Total | 369.08 |

SR349 DIACRYLATE is Ethoxylated Bisphenol-A Diacrylate, commercially available from Sartomer.

The coating composition was prepared by combining packages 1 and 2 with agitation immediately prior to use.

The following table contains data obtained in the physical evaluation of the above coating compositions described in examples I through VI in accordance with the test procedures described above. Data listed as for example in the case of pencil hardness, 6B/4B, indicates that these data were generated 24 hours and 7 days respectively, after application of the primer system.

| Coating Example | Pot-Life (min) | Time Until Sandable (Hr's) | Sward Hardness | Gloss 60° | D.O.I. | Pencil Hardness | Top Coat Adhesion |
|---|---|---|---|---|---|---|---|
| Example-I | 53. | 1. | 4/20 | 89/89 | 80/75 | 6B/HB | 5B/5B |
| Example-II | 21. | 1. | 4/14 | 90/90 | 80/80 | 6B/B | 5B/5B |
| Example-III | 51. | 1. | 6/20 | 90/90 | 80/80 | 6B/HB | 5B/5B |
| Example-IV | 58. | 1. | 4/22 | 90/90 | 75/75 | 6B/HB | 5B/5B |
| Example-V | 68. | 2. | 4/20 | 90/90 | 80/75 | 6B/4B | 5B/5B |
| Example-VI | 92. | 2. | 4/20 | 90/90 | 80/70 | 6B/HB | 5B/5B |

Pot-Life: Time until viscosity is measured as being greater than 250 cPs.

What is claimed is:
1. A curable coating composition comprising:
   (a) A polyepoxide resin which is essentially free of oxirane functionality and having an average of at least two amine groups per molecule and having a weight average molecular weight of from about 1000 to about 50,000;
   (b) an acetoacetate group functional polyester, which is the transesterification reaction product of a polyester polyol and an acetoacetate, the polyester polyol prepared by esterification of an organic polycarboxylic acid or anhydride thereof with organic polyol and/or epoxide, and having a weight average molecular weight of from about 1000 to about 50,000;

(c) a polyacrylate having at least two acrylate groups per molecule and having a weight average molecular weight from about one hundred to about 50,000.

2. The composition of claim 1 wherein the amine groups of the polyepoxide resin are blocked to form a ketimine containing polyepoxide resin.

3. The composition of claim 1 wherein the acetoacetate group functional polyester and the polyacrylate both react with the polyepoxide resin.

4. The composition of claim 2 wherein the ketimine containing polyepoxide resin is prepared from a polyamine, a ketone and an oxirane functional polyepoxide resin.

5. The composition of claim 4 wherein the oxirane functional polyepoxide resin is an epoxy novolak resin.

6. The composition of claim 1 wherein the acetoacetate group functional polyester is prepared by transesterification of a polyester polyol with an acetoacetate.

7. The composition of claim 6 wherein the acetoacetate is t-butyl acetoacetate.

8. The composition of claim 1 wherein the polyacrylate is prepared from the reaction of a polyol and an acrylate or methacrylate represented by the following structural formula:

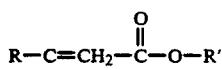

wherein R is H or CH3, and R' contains from 1 to 20 carbon atoms.

9. The composition of claim 8 wherein the polyol is selected from the group consisting of 1,6-hexanediol, trimethylolpropane, pentaerythritol, and ethoxylated bisphenol A.

10. The composition of claim 1 wherein the polyacrylate is prepared from the reaction of an isocyanate with a hydroxyl group containing acrylate or methacrylate monomer.

11. The composition of claim 8 wherein the polyacrylate is trimethylolpropane triacrylate.

12. The composition of claim 8 wherein the polyacrylate is pentaerythritol tetraacrylate.

13. The composition of claim 8 wherein the polyacrylate is 1,6-hexanediol diacrylate.

14. The composition of claim 8 wherein the polyacrylate is ethoxylated bisphenol A diacrylate.

15. The composition of claim 6 wherein the polyester polyol is prepared from monomers selected from the group consisting of neopentyl glycol, ethylene glycol, 1,4-cylcohexane dimethanol, dimethyl 1,4-cylohexanedicarboxylate, trimethylolpropane and isophthalic acid.

16. The composition of claim 1 wherein the acetoacetate group functional polyester has an acetoacetate equivalent weight of from about 100 to about 1000 (grams/equivalents).

17. The composition of claim 4 wherein the polyamine contains two primary amino groups and one secondary amino group.

18. The composition of claim 17 wherein the polyamine is selected from the group consisting of dipropylenetriamine, dibutylenetriamine and diethylenetriamine.

19. The composition of claim 4 wherein the ketone can be represented by the following structural formula:

wherein R and R' are independently alkanes having between one and 12 carbon atoms.

20. The composition of claim 19 wherein the ketone is selected from the group consisting of acetone, diethyl ketone, pentanone, cyclohexanone, ethylamyl ketone, isophorone, decanone and methylisobutyl ketone.

21. The composition of claim 1 wherein:
(a) the polyepoxide resin is present in an amount from about 25 to about 75 weight percent based on total resin solids, and
(b) the acetoacetate group functional polyester is present in an amount from about 25 to about 75 weight percent based on total resin solids, and
(c) the polyacrylate is present in an amount from about 1 to about 50 weight percent based on total resin solids.

22. The composition of claim 1 wherein the composition is essentially free of strong base.

* * * * *